March 1, 1927. 1,619,150
S. W. MITCHELL ET AL
DOG RACE TRACK
Filed March 16, 1926   3 Sheets-Sheet 2
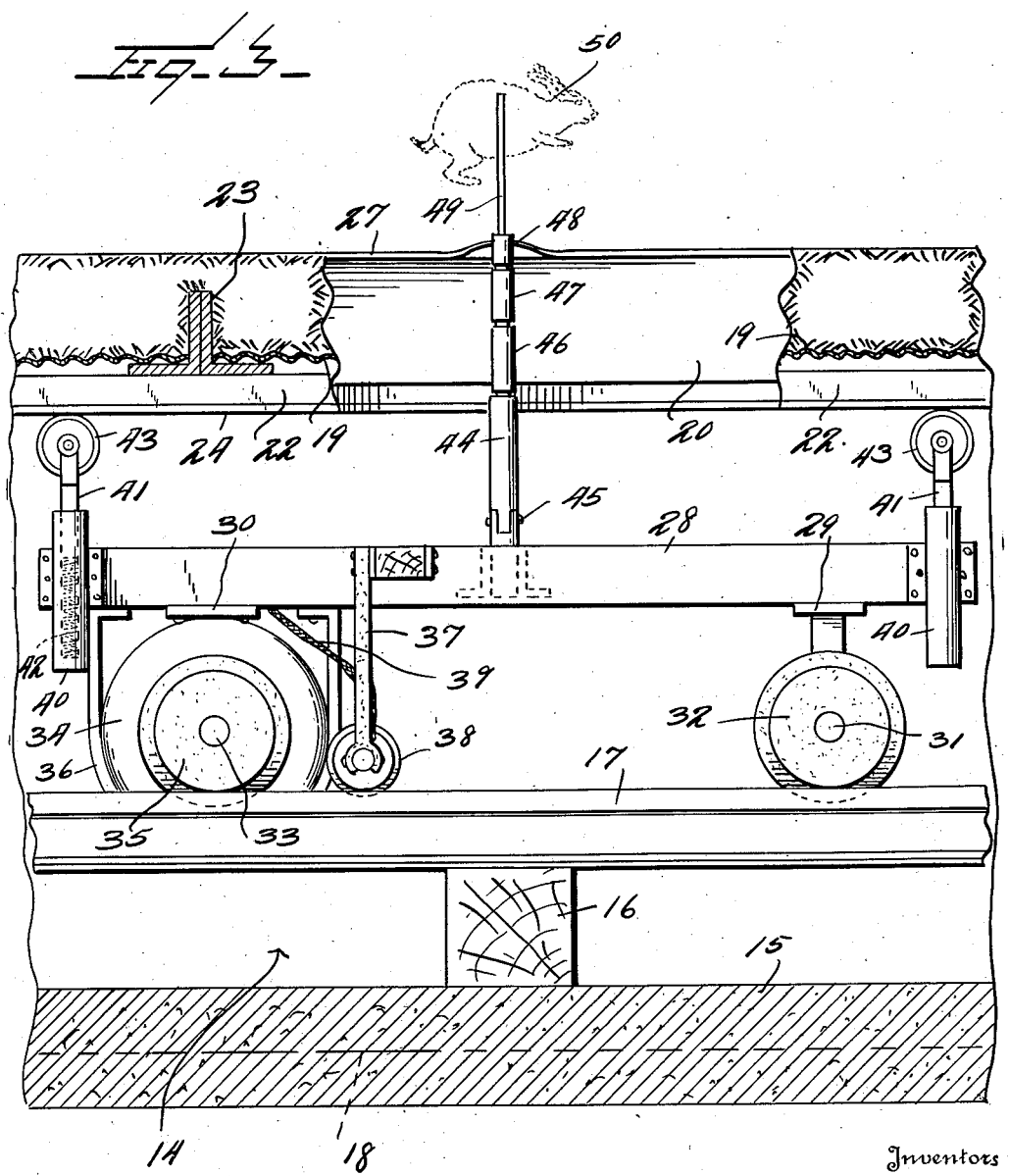

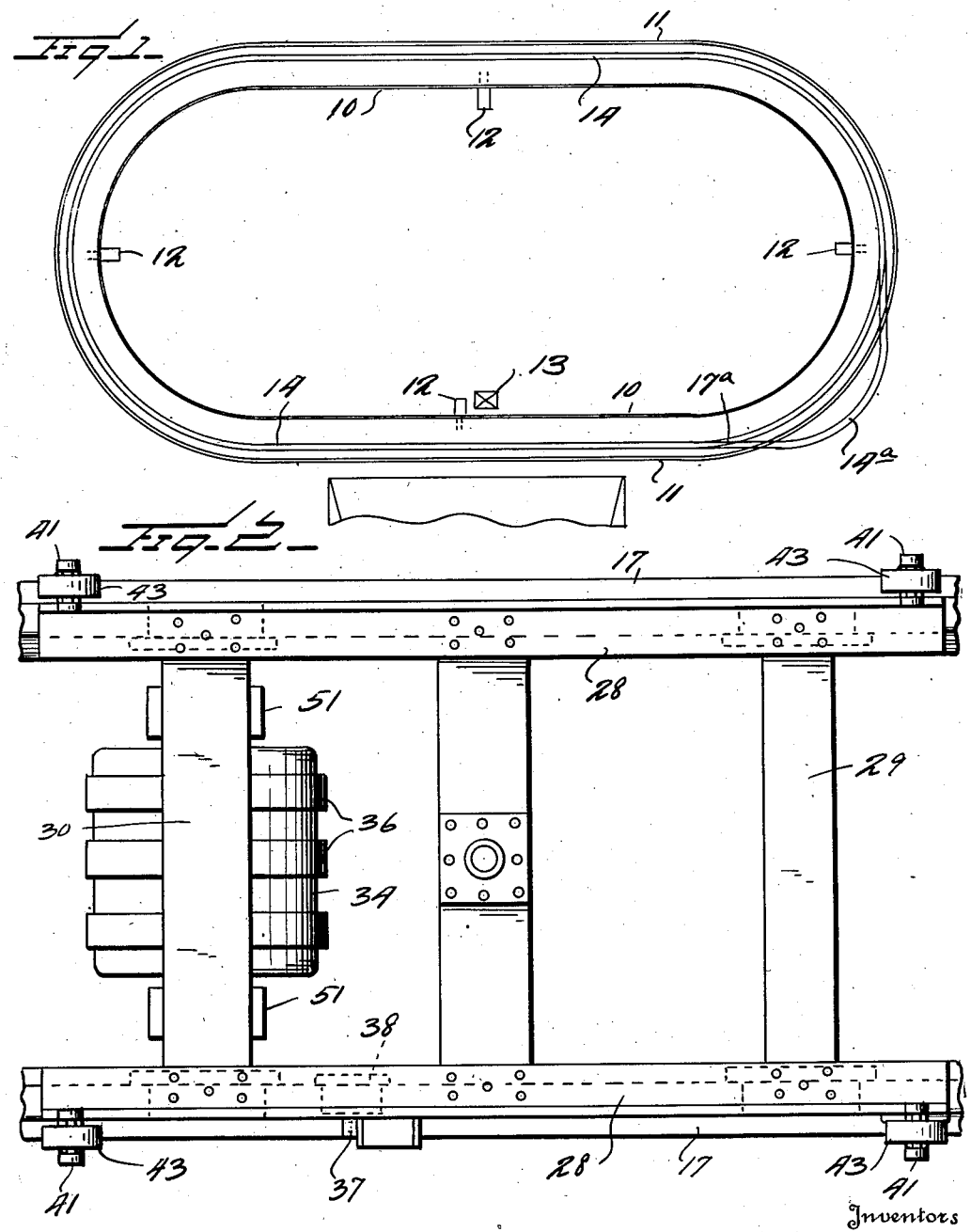

March 1, 1927.
S. W. MITCHELL ET AL
1,619,150
DOG RACE TRACK
Filed March 16, 1926   3 Sheets-Sheet 3
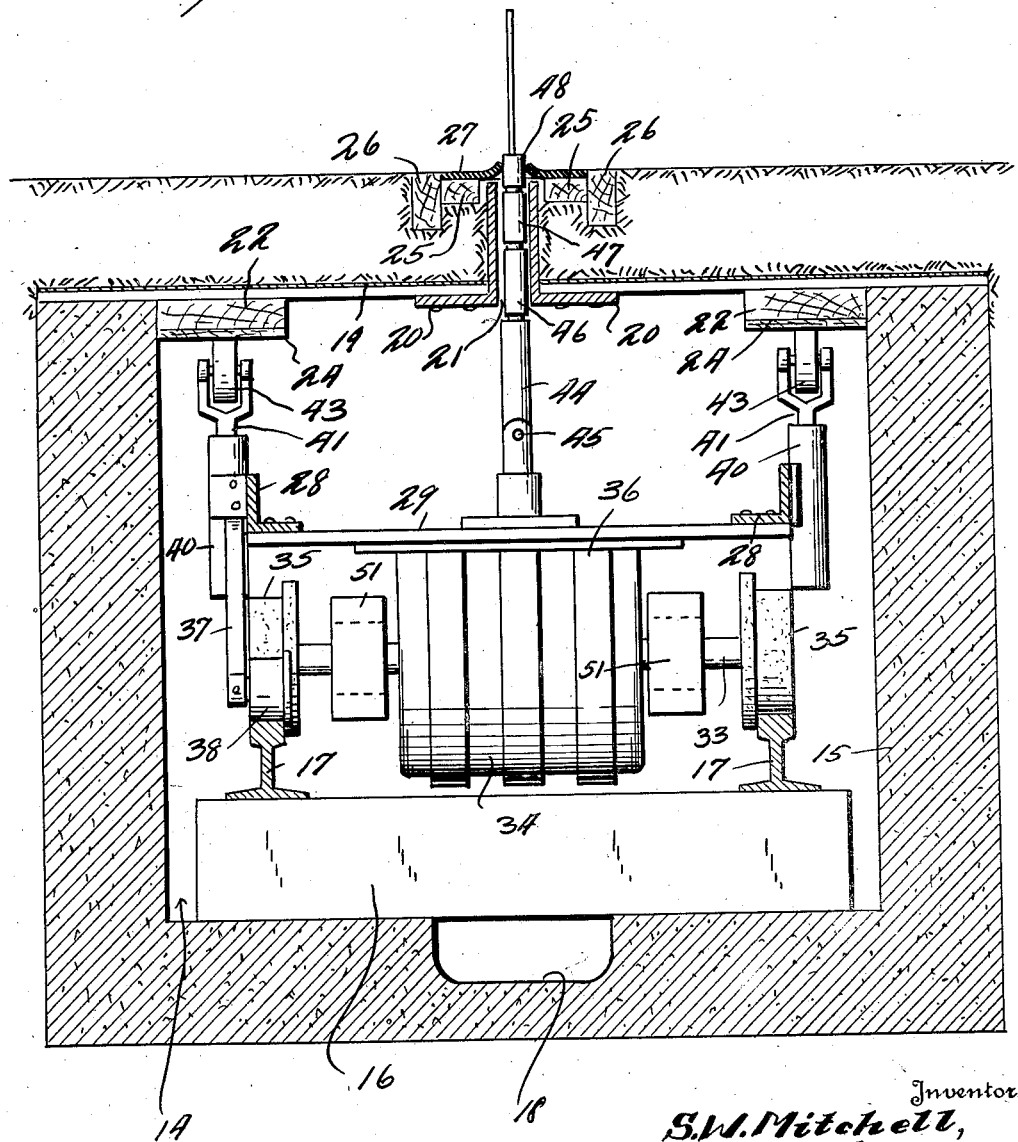

Patented Mar. 1, 1927.

1,619,150

UNITED STATES PATENT OFFICE.

SIDNEY W. MITCHELL, JACK NAUD, AND CLARENCE F. GOLDMAN, OF ST. PETERSBURG, FLORIDA.

DOG RACE TRACK.

Application filed March 16, 1926. Serial No. 95,064.

This invention relates to race tracks and particularly to tracks upon which dogs are raced by causing the dogs to follow after a lure or dummy animal, usually consisting of a stuffed rabbit or fox, this lure being caused to move around the race track and the dogs chasing after the lure.

The general object of the invention is to provide a method of supporting and propelling a dummy animal around the track, the propelling means being such that the stuffed rabbit or other dummy animal will move around the track with a minimum of artificiality and with all the propelling mechanism being concealed.

A further object is to provide a race track which is so constructed as to be entirely safe for racing dogs and which is provided with an endless pit having a track therein and having a covering formed with a slot and provide a trolley as it may be termed, operated by an electric motor and disposed within the pit on the rails thereon, this trolley having an arm carrying a lure as for instance, a stuffed rabbit or fox disposed above the ground and, of course, being carried around the track by the operation of the motor.

A further object is to provide means whereby after a suitable time or after a suitable number of rounds, the trolley with its lure may be switched out of the race track so as to prevent the lure from being torn to pieces by the dogs.

Our invention is illustrated in the accompanying drawings wherein:—

Figure 1 is a top plan view of a race course constructed in accordance with our invention;

Fig. 2 is a top plan view of the lure carrier;

Fig. 3 is a longitudinal sectional view through the channel or pit and through the lure carrier;

Fig. 4 is a transverse sectional view through the channel or pit and lure carrier.

Referring to these drawings and particularly to Figure 1 it will be seen that in this figure we have illustrated diagrammatically, a race course which may have any suitable form but is shown as oval, and which is provided with an interior fence 10 and an exterior fence 11, these fences being just high enough to prevent the dogs from leaping the fence.

Disposed at a plurality of points around the track are the passages or traps 12 by which the dogs may be allowed to enter the race track proper and at one point the race course is provided with a judges' stand 13 and, of course, there will be disposed adjacent the race course a grand stand and a control house from which the trolley for the artificial lure is controlled.

Extending entirely around the race course is an endless pit 14, as it may be termed, which preferably is defined by a concrete bottom and side walls, designated 15, and mounted upon the concrete base or bottom are the ties 16, carrying the rails 17. Preferably the bottom is formed with suitable drainage channels 18 of any desired character.

Mounted upon each side wall of the channel 15 is a supporting web 19 of corrugated iron or like material. These webs extend inward or toward each other and are attached to angle irons 20 which extend upward to the surface of the ground and define a longitudinally extending slot 21 between them. This corrugated iron 19 is supported by longitudinally extending wooden beams 22 disposed at opposite sides of the pit adjacent the upper ends of the side walls thereof and this beam is supported in turn at intervals by transversely extending angle irons 23. The end face of each wooden beam 22 is faced with smooth boards, designated 24. The angle irons or beams 20 extend up nearly to the surface of the ground and disposed on each side of the upper margins of these angle irons 20 are wooden blocks 25 and 26, the blocks 26 extending to the surface of the ground and the blocks 25 being slightly below the surface. Rubber strips 27 are attached to these blocks 25 and extend over and cover the slot 21 so that this slot is not noticeable and so that a good running surface is provided.

Operating over the rails 17 is a carriage comprising the longitudinally extending angle irons 28 connected at intervals by transverse connecting members 29 and 30. The forward end of the carriage has mounted thereon a transversely extending forward axle 31 carrying upon it the wood or fiber wheels 32 which engage the rails 17, these wheels being preferably flanged. The rear of the carriage is supported by means of a transverse shaft 33 constituting an axle, this shaft being part of the electric motor 34, the extremities of the shaft carrying the flanged wheels 35 which are of non-conducting material such as hard fiber. The motor 34 is supported by means of straps 36 from one of the transverse members 30 or is otherwise suitably connected to the carriage and also mounted upon the carriage is a depending post 37 of non-conductive material, carrying at its end a copper trolley wheel 38 which bears against one of the rails and from which the current is taken by means of a wire or conductor 39 to the motor. The motor is such that either an alternating current motor or a direct current motor may be used and we do not wish to be limited to the particular way of mounting the motor or the particular means for or the particular method of conducting current to the motor.
At the corners of the carriage frame there are provided the vertical posts 40 having therein wheel supporting members 41 urged upward by means of springs 42, and carrying at their upper ends the wheels 43 mounted in ball bearings and bearing against the under face of the smooth board track 24. Inasmuch as these wheels are urged upward by the springs 42 it will be seen that the car is yieldingly held against jogging or bumping and will be caused to run smoothly upon the track and without any liability of becoming derailed.

Mounted upon the middle of the car frame is an upwardly extending post or rod 44 supported by a ball and socket joint 45, this rod extending upward and through the space 21. The upper end of the rod where it passes through the space 21 is provided with a plurality of anti-friction rollers 46, 47 and 48, the roller 48 being disposed to bear against the edge faces of the rubber strips 27 which cover the slot or opening 21 so that as the car moves along the track, the roller 48 will open the flexible rubber strips, which rubber strips will close after the roller 48. The upper end of this metallic post 44 is formed with a socket which carries a wooden supporting rod 49 upon which is supported the artificial rabbit, fox or other stuffed animal 50.

As illustrated in Figure 1, a switch pit 14ª leads off from the pit 14 at one point of the race course as, for instance, at a point where the straight portion of the race course merges into the curved end portions, this switch pit extending out through the outer fence 11 for a distance and then extending inward through the fence and then merging into the opening into the main portion 14 of the pit. The outer fence is, of course, so constructed that the dogs cannot follow the trolley as it passes through the fence 11 into the switch pit 14ª and thus after the trolley has been carried around the track a desired number of times, the switch rails 17ª may be shifted to cause the carriage to be shunted off into the switch pit 14ª. This electric switch is controlled from a control house located at any suitable point and the switch may be operated either mechanically or electrically to cause the shifting of the switch rails 17ª. Preferably magnetic brakes 51 are mounted upon the axle or shaft of the motor as shown in Figure 4, these magnetic brakes being preferably automatically actuated by the cutting off of current to the motor and cause the brakes to be applied as soon as the carriage has run off onto the side track or switch track.

The manner in which the dogs are liberated from the passage ways or kennels 12 forms no part of our invention nor does the general layout of the race course form any part of our invention. Of course the running of dog races by a race course having a mechanically operated lure is old and well known and, therefore, we need not describe the manner in which this race course is used. Our construction is such that the carriage supporting the lure runs very evenly without any irregularity and without any chance of running off the tracks which is particularly necessary under these circumstances as if the car should run off the tracks, the dogs would immediately tear to pieces the artificial lure and the race would be spoiled. The ball and socket joint 45 permits lateral oscillation of the rod supporting the lure so that it will conform to any irregularities in the slot 21 and in the rubber strips which normally cover this slot. Inasmuch as this slot is normally covered by the rubber strips it is obvious that the dogs will not get their feet caught in the slot.

Our invention differs from other dog racing tracks in that there is no extending arm to support the rabbit and this eliminates to a great extent, the appearance of artificiality which is present in devices now in use. With our device the rabbit is run over the race course at a higher speed than in other devices known to us and at the same time the slot is entirely covered. The rollers disposed at the corners of the carriage act to prevent vibration of the carriage at high speed, especially when making turns and preventing the carriage from being lifted from the track at the turns due to centrifugal force. The rollers permit the frame of the carriage or trolley to be made of very light material and thus eliminate the necessity of using a very heavy carriage in order to retain the same on the track.

While we have not illustrated any detailed magnetic brakes, these are in all respects such as those commonly used on elevators or hoists. The magnetic brakes permit perfect control of the car at all times. On all race courses known to us the carriage carrying the lure is braked entirely by mechanical means, the car being stopped by simply spreading the rails at the time the car or carriage enters the switch or "escape," while at the same time the motor is reversed.

While we have illustrated certain details of construction and arrangement of parts which we have found to be particularly effective in actual practice we do not wish to be limited thereto as it is obvious that many changes might be made therein without departing from the spirit of the invention as defined in the appended claims.

We claim:—

1. A race course having an underground channel and a surface slot communicating with the channel, the slot being defined by two longitudinally extending angle irons, flexible yielding strips disposed on each side of the slot at the surface of the track and normally closing said slot, and a carriage operating within the channel and having a lure support extending up through the slot, the support being mounted for lateral movement upon the carriage and having a plurality of anti-friction rollers disposed one above the other, the uppermost roller bearing against the rubber strips to open them as the carriage passes and the lower rollers bearing against the angle irons forming the side walls of the slot.

2. A race course having an underground channel and a surface slot communicating therewith, and flexible yielding strips disposed on each side of the slot and normally closing the same, and a carriage operating within the channel and having a lure support extending up through the slot, the support having an anti-friction roller bearing against the rubber strips to open them as the carriage passes.

3. A race course having an underground channel and a surface slot communicating therewith, and flexible yielding strips disposed on each side of the slot and normally closing the same, and a carriage operating within the channel and having a lure support extending up through the slot, the support having an anti-friction roller bearing against the rubber strips to open them as the carriage passes, said support being mounted upon the carriage by a ball and socket joint whereby the support may have lateral movement within the slot.

4. A race course having an underground channel and a surface slot communicating therewith, tracks disposed within the underground channel, and a carriage operating over the tracks and having wheels engaging therewith, the underground channel having overhead transversely flat, relatively wide tracks, upwardly urged wheels carried by the carriage and bearing against said overhead tracks to hold the carriage to the first named tracks, and a lure support extending upward through said slot.

5. A race course having an underground channel and a surface slot communicating therewith, tracks mounted within the channel, a carriage having wheels engaging said tracks, an electric motor mounted upon the carriage and operatively engaging the wheels to drive the same, a lure support extending upward through said slot and mounted upon the carriage and having movement laterally, transversely flat, relatively wide overhead tracks forming part of the channel, rollers mounted on the carriage and bearing against said overhead tracks, and springs urging said rollers upward.

6. A race course having an underground channel and a surface slot communicating therewith, there being supporting members disposed on each side of said slot at the surface of the slot, rubber strips attached to said members and normally covering said slot, rails disposed within the channel, a motor driven carriage mounted upon said rails, and a lure support comprising a vertical post carried upon the carriage and extending upward through said slot and having anti-frictional rollers, bearing against the rubber strips, the upper end of the post having means for supporting a lure thereon.

In testimony whereof we hereunto affix our signatures.

SIDNEY W. MITCHELL.
JACK NAUD.
CLARENCE F. GOLDMAN.